(12) United States Patent
Chatterjee et al.

(10) Patent No.: US 7,718,755 B2
(45) Date of Patent: May 18, 2010

(54) ALIPHATIC DIOL-BASED POLYCARBONATES, METHOD OF MAKING, AND ARTICLES FORMED THEREFROM

(75) Inventors: Guatam Chatterjee, Karnataka (IN);
Dibakar Dhara, West Bengal (IN);
Muthuvijayan Jegathesan, Tamil Nadu (IN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 146 days.

(21) Appl. No.: 11/874,871

(22) Filed: Oct. 18, 2007

(65) Prior Publication Data

US 2009/0105444 A1  Apr. 23, 2009

(51) Int. Cl.
  C08G 64/00  (2006.01)
  C08G 63/02  (2006.01)
(52) U.S. Cl. .................. 528/196; 524/502; 524/599; 525/410; 528/198; 528/271; 528/272
(58) Field of Classification Search ................ 524/502, 524/599; 525/410; 528/196, 198, 271, 272
  See application file for complete search history.

(56) References Cited

U.S. PATENT DOCUMENTS

| 4,506,066 | A | 3/1985 | Medem et al. |
| 7,041,775 | B2 | 5/2006 | Martinez et al. |
| 7,138,479 | B2 | 11/2006 | Dhara et al. |
| 2006/0149024 | A1 | 7/2006 | Ono et al. |
| 2008/0015331 | A1 | 1/2008 | Terado et al. |
| 2009/0105393 | A1* | 4/2009 | Jansen et al. .......... 524/502 |

FOREIGN PATENT DOCUMENTS

| EP | 1752482 | * | 2/2007 |
| EP | 2053072 A1 | | 4/2009 |
| GB | 1079686 | | 8/1967 |

OTHER PUBLICATIONS

Braun, et al. Polyesters with 1.4:3.8-dianhydrosobritol as polymeric plasticizers for PVC, Die Angewandte Makromolekulare Chemie, 1992, p. 191-205, vol. 199, Huthig & Wepf Verlag, Basel.

Kricheldorf, et al., Polymers of Carbonic Acid. 22. Cholesteric Polycarbonates Derived from (S)-((2-Methylbutyl)thio)hydroquinone or Isosorbide, Macromolecules 29, 1996, p. 8077-8082, vol. 29 , American Chemical Society.

DE3002276, Published Oct. 18, 1984: Human Translation; 11 pages.

Betiku, Ola et al.: "Synthesis and Characterization of Isosorbide Carbonate: Lactide Copolymers", Polymer Preprints (American Chemical Society, Division of Polymer Chemistry), (2007), 48(2), 802-803. (XP002529896) abstract.

* cited by examiner

*Primary Examiner*—Terressa M Boykin

(57) ABSTRACT

The above-described and other deficiencies of the art are met by a method of making a polycarbonate polymer comprising isosorbide carbonate units, comprising melt reacting a dihydroxy compound comprising an isosorbide of the general formula (2a):

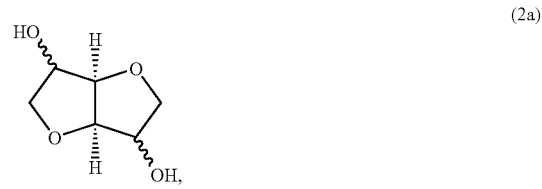

and an activated carbonate, in the presence of a catalyst consisting essentially of a sodium salt capable of providing a hydroxide ion, wherein the polycarbonate polymer comprises greater than or equal to 50 mol % isosorbide carbonate units, and wherein the polycarbonate polymer has a Mw of greater than or equal to about 40,000 g/mol as determined by gel-permeation chromatography relative to polystyrene standards. Polycarbonates comprising the isosorbide carbonate unit, including isosorbide homopolycarbonate and an isosorbide-based polyester-polycarbonate, are also disclosed, as are a thermoplastic composition and an article including the isosorbide-based polycarbonate polymer.

25 Claims, 1 Drawing Sheet

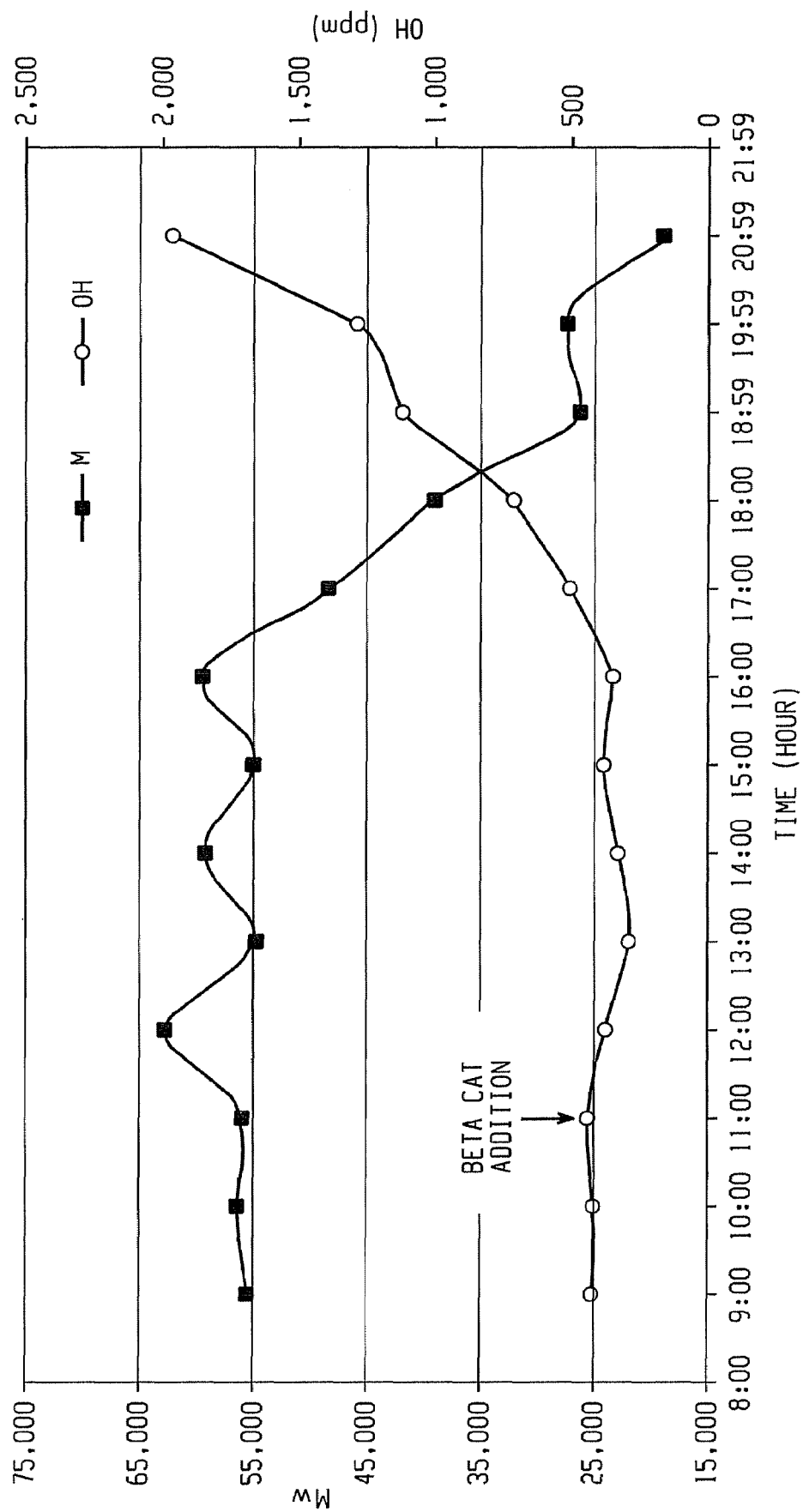
Figure

ALIPHATIC DIOL-BASED POLYCARBONATES, METHOD OF MAKING, AND ARTICLES FORMED THEREFROM

BACKGROUND

This disclosure relates to polycarbonates comprising aliphatic diols, and in particular to isosorbide-based polycarbonates, and methods of manufacture thereof.

Polycarbonate homopolymers and copolymers of aliphatic diols, particularly isosorbides (i.e., 2,6-dioxabicyclo[3.3.0] octan-4,8-diol and isomers), are of great interest to the chemical industry because such aliphatic diols can be produced from renewable resources, namely sugars, rather than from petroleum feed stocks as for most presently used bisphenol monomers.

However, the homo- or copolycarbonate incorporating isosorbide needs to be of sufficiently high molecular weight to have properties of practical importance. There have been several previous attempts to produce polycarbonates from isosorbide, but each of these attempts has had its difficulties, and therefore at present, such polycarbonates are not produced commercially. For instance, the primary method for preparing polycarbonates generally uses interfacial polymerization in methylene chloride/water using phosgene and alkali. In this method, one or more diols (e.g., bisphenols) in an aqueous alkaline solution are mixed thoroughly, with stirring, in methylene chloride or other suitable halogenated solvent and can be converted to high molecular weight polycarbonates by introducing phosgene. However, this method is not suitable for preparing homopolycarbonate derived from isosorbide because the isosorbide solubility in water is too high, impeding the interphase transfer, and its acidity too low to proceed at an adequate rate in pH ranges suitable for interfacial phosgenation.

Isosorbide polycarbonate homopolymer has been prepared by solution polycondensation in pyridine containing solvent mixtures at low temperatures. It has also been prepared by converting isosorbide to the bischloroformate and polymerized by interfacial polymerization. The polymer obtained exhibited a Tg of 144 to 155° C. (See e.g., *Angew. Makromol. Chem,* 1993, vol. 199, p. 191; U.S. Pat. No. 4,506,066; *Macromolecules* 1996, vol. 29, p. 8077). Attempts have also been made to prepare copolycarbonates of isosorbide with bisphenol A by interfacial method in an alkaline water/methylene chloride mixture with phosgene. Only bisphenol A polycarbonate was obtained and no incorporation of isosorbide was observed (U.S. Pat. No. 4,506,066).

An alternative method of synthesizing polycarbonates is by use of melt polymerization. The reaction of a bisphenol with a source of carbonate units such as diphenyl carbonate (DPC) in the presence of a catalyst and the absence of solvent are typical of melt polymerization method. A first attempt to prepare isosorbide polycarbonate by melt transesterification reaction with DPC was reported in 1967. The polycondensation was carried out without the use of catalyst at 221° C. and the pressure was reduced from atmospheric pressure to 1 mm Hg. (Great Britain Patent No. 1,079,686). A brown white powder containing higher melting and cross-linked constituents was obtained. Further attempts to prepare copolycarbonates of isosorbide with BPA, 4,4'-dihydroxydiphenyl sulfide, and 4,4'-dihydroxy biphenyl by condensation with DPC at a temperature up to 200° C. using disodium salt of bisphenol A as transesterification catalyst was carried out and resulted in the formation of oligocarbonates. The phenylcarbonate end groups of the oligocarbonates were hydrolyzed and polymerized by interfacial polymerization to high molecular weight copolycarbonates. (German Patent No. OS 3,002,276). The melt polycondensation approach was repeated in 1981 (U.S. Pat. No. 4,506,066), wherein isosorbide was condensed with DPC at 220° C. and a pale brown polymer along with insoluble constituents was obtained. In this study, it was presumed that during melt polymerization conditions branching had occurred and leads to the formation of insoluble inhomogeneous product. Thus, it was concluded that melt polycondensation is not suitable for the preparation of isosorbide homo- and copolycarbonates. Further evidence to this comes from the detailed polymerization work carried out by Kricheldorf et. al. (*Macromolecules* 1996, vol. 29, p. 8077). One-step polycondensation of isosorbide diphenyl carbonate with various diphenols catalyzed by ZnO was carried out. This study also led to the formation of product which was insoluble in all common solvents tested.

U.S. Pat. No. 7,138,479 disclosed an activated carbonate melt process to synthesize isosorbide based copolycarbonate which had random arrangements of structural units. However, the attempts to synthesize isosorbide homopolycarbonate using this method only resulted in relatively low molecular weight isosorbide carbonate homopolymer. Examples 1 and 2 in Table 2 of U.S. Pat. No. 7,138,479 disclosed Mw values (gel permeation chromatography, polystyrene standards) of 16,060 g/mol and 20,678 g/mol, prepared using non-activated and activated melt polymerization processes, respectively; however, such Mw values are not sufficiently high for practical use in most, if not all, commercial applications.

SUMMARY OF THE INVENTION

There accordingly remains a need in the art for high molecular weight isosorbide polycarbonate homopolymers and copolymers, and thus an efficient method to produce high quality homopolycarbonates from aliphatic diols, specifically isosorbide. The above-described and other deficiencies of the art are overcome by a method of making a polycarbonate polymer comprising isosorbide carbonate units, comprising melt reacting a dihydroxy compound comprising an isosorbide of the general formula (2a):

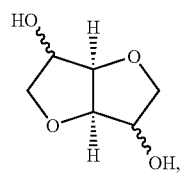

and an activated carbonate, in the presence of a catalyst consisting essentially of a sodium salt capable of providing a hydroxide ion, wherein the polycarbonate polymer comprises greater than or equal to 50 mol % isosorbide carbonate units, and wherein the polycarbonate polymer has a Mw of greater than or equal to about 40,000 g/mol as determined by gel-permeation chromatography relative to polystyrene standards.

In another embodiment, a polycarbonate polymer comprises carbonate units derived from a dihydroxy compound comprising an isosorbide of general formula (2a):

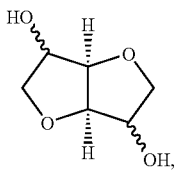

(2a)

and an activated carbonate, wherein the polycarbonate polymer comprises greater than 50 mol % isosorbide-derived carbonate units, and wherein the polycarbonate polymer has a Mw of greater than or equal to about 40,000 g/mol as determined by gel-permeation chromatography relative to polystyrene standards.

In another embodiment, a method of making a polycarbonate copolymer comprising isosorbide carbonate units comprises melt reacting a dihydroxy compound comprising an isosorbide of the general formula (2a):

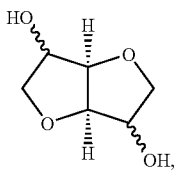

(2a)

a $C_{2-13}$ aliphatic dioic acid or derivative thereof, and an activated carbonate, in the presence of a catalyst consisting essentially of a sodium salt capable of providing a hydroxide ion, wherein the polycarbonate polymer comprises greater than or equal to 50 mol % isosorbide carbonate units, and wherein the polycarbonate polymer has a Mw of greater than or equal to about 46,000 g/mol as determined by gel-permeation chromatography relative to polystyrene standards.

A description of the figures, which are meant to be exemplary and not limiting, is provided below.

BRIEF DESCRIPTION OF THE FIGURES

The FIGURE is a superimposed diagrammatic plot of weight averaged molecular weight (Mw) and hydroxide concentration versus time for the polymerization of isosorbide and bis(methyl salicyl)carbonate in the presence of both an alpha and beta catalyst.

The above described and other features are exemplified by the following detailed description.

DETAILED DESCRIPTION OF THE INVENTION

Described herein is a useful method for preparing aliphatic diol-based polycarbonates, particularly aliphatic diol-based polycarbonates with high levels of aliphatic diol monomer. Surprisingly, a high molecular weight (i.e., Mw greater than 40,000 g/mol as determined by gel permeation chromatography calibrated to polystyrene standards) aliphatic diol-based polycarbonate can be prepared by a melt-polymerization method using an activated carbonate source in the presence of a single catalyst. The molecular weight of the resulting polymer is significantly higher than can be achieved for a comparable polymer prepared in the presence of the traditional two catalyst system of an alpha and beta catalyst. The aliphatic diol used is derived from a biologically-derived sugar, and specifically, comprises one or more isomers of isosorbide. Such aliphatic diol-based polycarbonates as disclosed herein desirably have high molecular weights as disclosed above, and are advantageous in that they derive from renewable, biologically-based feedstocks and as such can have a favorable impact on the environment. Such aliphatic diol-based polycarbonates have properties that are comparable with those of typical non-aliphatic diol-based polycarbonates, including impact strength, transparency, surface properties, moldability, ductility, and the like. In addition, the aliphatic diol-based polycarbonates disclosed herein have other advantageous properties, such as biodegradability, improved scratch resistance, impact strength, and transparency, and are particularly useful in high use exterior applications.

As used herein, the term "polycarbonate" includes generally homopolycarbonates and copolycarbonates having repeating structural carbonate units of the formula (1):

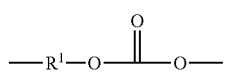

(1)

wherein the $R^1$ groups are derived from a dihydroxy compound that can be aliphatic, aromatic, or a combination of these.

Specifically, as disclosed herein, the polycarbonates are aliphatic diol-based polycarbonates in which the $R^1$ groups of carbonate units of formula (1) comprise aliphatic groups, and in particular fused cyclic alkyloxy groups, such as those based on fused furan ring structures.

Specifically, the aliphatic diol-based polycarbonate comprises aliphatic diol-based carbonate units shown in formula (2):

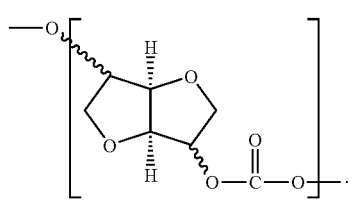

(2)

The aliphatic diol-based carbonate units of formula (2) can be derived from the corresponding aliphatic diol or mixture of isomers of the aliphatic diol. The stereochemistry for the aliphatic diol-based carbonate units of formula (2a) is not particularly limited. Specifically, the aliphatic diol is an isosorbide of the general formula (2a):

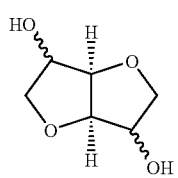

(2a)

and is also known interchangeably as 2,6-dioxabicyclo[3.3.0] octan-4,8-diol, 1,4:3,6-dianhydro-D-glucitol, and 2,3,3a,5,6, 6a-hexahydrofuro[3,2-b]furan-3,6-diol. The stereochemistry for the isosorbide of general formula (2a) is also not particularly limited. These diols are prepared by the dehydration of the corresponding hexitols. Hexitols are produced commercially from the corresponding sugars (aldohexose). Aliphatic diols of formula (2a) include 1,4; 3,6-dianhydro-D glucitol, of formula (2b); 1,4; 3,6-dianhydro-D mannitol, of formula (2c); and 1,4; 3,6-dianhydro-L iditol, of formula (2d), and combinations of two or more of the aforementioned diols.

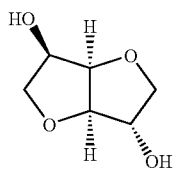

(2b)

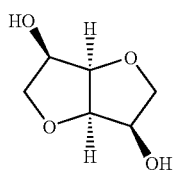

(2c)

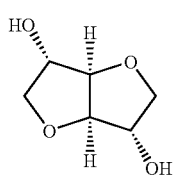

(2d)

In a specific embodiment, the diol of the formula (2b) is desirable because it is a rigid, chemically and thermally stable aliphatic diol that can produce higher Tg copolymers than the other diols of formulas (2c) and (2d).

The polycarbonate, including the aliphatic diol-based polycarbonate as disclosed herein, can further comprise units derived from a dihydroxy compound, such as for example a bisphenol, that differs from the aliphatic diol of formula (2a). In one embodiment, each $R^1$ group is a divalent aromatic group, for example derived from an aromatic dihydroxy compound of the formula (3):

HO-A$^1$-Y$^1$-A$^2$-OH     (3)

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (3) are bisphenol compounds of general formula (4):

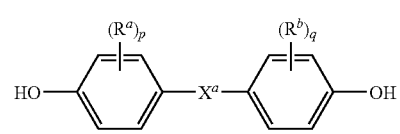

(4)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5a) or (5b):

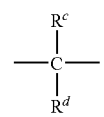

(5a)

(5b)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

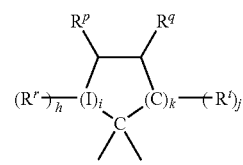

(6)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

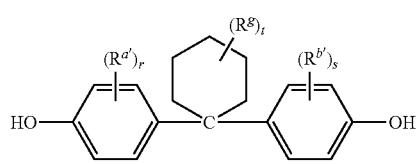

(7)

wherein substituents $R^{a'}$ and $R^{b'}$ can be aliphatic or aromatic, straight chain, cyclic, bicyclic, branched, saturated, or unsaturated, and $R^g$ is $C_{1-12}$ alkyl or halogen, r and s are independently integers from 0 to 4, and t is an integer of 0 to 10. It will be understood that hydrogen fills each valency when r is 0, s is 0, and t is 0. In one embodiment, each $R^{a'}$ and $R^{b'}$ is independently $C_{1-12}$ alkyl. In a specific embodiment, where r and/or s is 1 or greater, at least one of each of $R^{a'}$ and $R^{b'}$ are disposed meta to the cyclohexylidene bridging group. The substituents $R^{a'}$ $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Useful cyclohexane-containing bisphenols of formula (7) where t is 3, r and s are 0, and $R^g$ is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the APEC® trade name.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (2) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one of the foregoing dihydroxy aromatic compounds can also be used.

Small amounts of other types of diols can be present in the aliphatic diol-based polycarbonate. For example, a small portion of $R^1$ can be derived from a dihydroxy aromatic compound of formula (8):

(8)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (8) in which the —OH groups are substituted meta to one another, and wherein $R^f$ and u are as described above, are also generally referred to herein as resorcinols. Examples of compounds that can be represented by the formula (8) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

"Polycarbonate" as used herein includes homopolycarbonates and copolymers comprising different $R^1$ moieties in the carbonate (referred to herein as "copolycarbonates"). In one specific embodiment, the polycarbonate is a linear homopolymer or copolymer comprising units derived from bisphenol A, in which each of $A^1$ and $A^2$ is p-phenylene and $Y^1$ is isopropylidene in formula (3). More specifically, at least 60%, particularly at least 80% of the $R^1$ groups in the polycarbonate are derived from bisphenol A.

Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

The relative amount of each type of carbonate unit present in the aliphatic diol-based polycarbonate will depend on the desired properties of the copolymer, and are readily ascertainable by one of ordinary skill in the art without undue experimentation, using the guidance provided herein. In general, the aliphatic diol-based polycarbonate will comprise 1 to 100 mol %, specifically 10 to 100 mol %, even more specifically 15 to 100 mol % of aliphatic diol-based carbonate units of formula (2). In one embodiment the aliphatic diol-based polycarbonate comprises greater than 50 mol %, specifically greater than 60 mol %, and more specifically greater than 70 mol % of aliphatic diol-based carbonate units, based on the total number of carbonate units in the aliphatic diol-based polycarbonate. In an embodiment, the aliphatic diol-based carbonate units are derived from the aliphatic diol of formula (2). The aliphatic diol-based polycarbonate can further comprise 0 to 50 mol %, specifically 0 to 40 mol %, even more specifically 0 to 30 mol % of additional carbonate units. In an embodiment, each of the additional carbonate units is derived from the dihydroxy aromatic compound of formula (3). In a specific embodiment, the aliphatic diol-based polycarbonate is a homopolymer consisting essentially of carbonate units derived from the aliphatic diol of formula (2). In another specific embodiment, the aliphatic diol-based polycarbonate is a copolymer comprising 60 to 99 mol %, specifically 65 to 95 mol %, more specifically 70 to 90 mol %, of aliphatic diol-based carbonate units of formula (2). In an embodiment, the aliphatic diol-based polycarbonate is a copolymer of formula (9) comprising aliphatic diol-based carbonate units of formula (2) and additional carbonate units of formula (1) that are not identical to the carbonate units of formula (2):

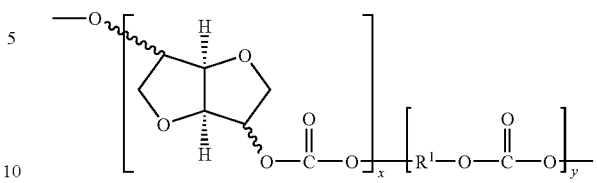

wherein $R^1$ is as described above, and the molar percentage ratio of carbonate units x to y is 50:50 to 100:0, specifically 60:40 to 100:0, and more specifically 70:30 to 100:0.

Each of the foregoing mole percents for formula (9) is based on the total moles of aliphatic diol-based carbonate units of formula (1) and additional carbonate units. In an embodiment, where the aliphatic diol-based polycarbonate of formula (9) is derived from an aliphatic diol-based dihydroxy compound of formula (2a) and a dihydroxy aromatic compound of formula (3), the mole percents are based on the total moles of aliphatic diol-based dihydroxy compound of formula (2) and dihydroxy aromatic compound of formula (3) used to manufacture the aliphatic diol-based polycarbonate.

Other types of dihydroxy monomers, e.g., those of formula (9), can be used in amounts of up to 10 mol %, specifically up to 7 mol %, and even more specifically, up to 5 mol %. In an embodiment, the aliphatic diol-based polycarbonate consists essentially of units derived from the aliphatic diol and a dihydroxy compound, wherein any dihydroxy compounds used do not significantly adversely affect the desired properties of the aliphatic diol-based polycarbonate. In another specific embodiment, only monomers (i.e., diols) that fall within the scope of formulas (2) and (4) are used, that is, the aliphatic diol-based polycarbonate consists of units derived from the aliphatic diol and dihydroxy aromatic compounds.

Also as disclosed herein, polycarbonates including the aliphatic diol-based polycarbonate can further include copolymers comprising carbonate units and other types of polymer units, such as ester units, polysiloxane units, and combinations comprising at least one of homopolycarbonates and copolycarbonates. A specific type of polycarbonate copolymer of this type is a polyester carbonate, also known as a polyester-polycarbonate. Such copolymers further contain, in addition to recurring carbonate chain units of the formula (1), carbonate units derived from oligomeric ester-containing dihydroxy compounds (also referred to herein as hydroxy end-capped oligomeric arylate esters) comprising repeating units of formula (10):

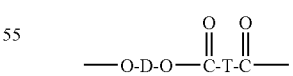

wherein D is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-120}$ alkylene group, a $C_{6-20}$ alicyclic group, a $C_{6-20}$ allyl aromatic group, or a $C_{6-20}$ aromatic group.

In an embodiment, D is a $C_{2-30}$ alkylene group having a straight chain, branched chain, or cyclic (including polycyclic) structure. In an embodiment, D is a group derived from an aliphatic diol of formula (2a). In another embodiment, D is derived from an aromatic dihydroxy aromatic compound of formula (4) above. In another embodiment, D is derived from a dihydroxy aromatic compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, D is a $C_{2-6}$ alkylene group and T is p-phenylene, m-phenylene, naphthalene, a divalent cycloaliphatic group, or a combination thereof. This class of polyester includes the poly(allylene terephthalates).

The number of ester units in a polyester-polycarbonate is typically greater than or equal to 4, specifically greater than or equal to 5, and more specifically greater than or equal to 8. Also in an embodiment, the number of ester units of formula (10) is less than or equal to 100, specifically less than or equal to 90, more specifically less than or equal to 70. It will be understood that the low and high endpoint values for the number of ester units of formula (10) present are independently combinable. In a specific embodiment, the number of ester units of formula (10) in a polyester-polycarbonate can be 4 to 50, specifically 5 to 30, more specifically 8 to 25, and still more specifically 10 to 20. The molar ratio of ester units to carbonate units in the polyester-polycarbonate copolymers may vary broadly, for example 1:99 to 99:1, specifically 10:90 to 90:10, more specifically 25:75 to 75:25, depending on the desired properties of the final composition.

In an embodiment, the polyester unit of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the carbonate units of a polyester-polycarbonate can be derived from aliphatic diols of formula (2a). Alternatively or in addition, in an exemplary embodiment, the carbonate units can be derived from resorcinol and/or bisphenol A. In another exemplary embodiment, the carbonate units of the polyester-polycarbonate can be derived from resorcinol and bisphenol A in a resulting molar ratio of resorcinol carbonate units to bisphenol A carbonate unit of 1:99 to 99:1.

In a specific embodiment, the polyester unit of an aliphatic diol-based polyester polycarbonate is derived from the aliphatic diol of formula (2a) as described above, and a $C_{2-13}$ aliphatic dioic acid or derivative thereof from which T in formula (10) is derived. Such diacids are also referred to generally as an alpha-omega diacids, and may be derived from natural sources, or from condensation of readily available feedstock. The dioic acid may be straight chain or branched, and may contain a cyclic group. Exemplary diacids include oxalic acid, 1,4-propanedioic acid, 1,4-butanedioic acid, 1,6-hexanedioic acid, 1,8-octanedioic acid, 1,10-decanedioic acid, and 1,12-dodecanedioic acid (DDDA). Dodecanedioic acid (the alpha-omega isomer, also referred to as the 1,12-isomer), a commonly available alpha-omega diacid include that derived from oligomers of butadiene, is preferred. Such a $C_{12}$ aliphatic dioic acid (which comprises a $C_{10}$ alkylene chain connecting two carboxylic acid end groups) is derived industrially from Ni-catalyzed cyclotrimerization of butadiene, hydrogenation to form cyclododecane, and is followed by ring opening oxidation to form the dodecanedioic acid. In an exemplary embodiment, polyester units of formula (10) derive from the reaction product of isosorbide and DDDA (in which D corresponds to the bicyclo [3.3.0] ring structure of isosorbide as seen in formula (2a), and T corresponds to the $C_{10}$ alkylene chain that connects the two carboxyl end groups of the DDDA), are prepared in situ during melt polymerization of isosorbide and DDDA in the presence of a carbonate source, and in particular an activated carbonate source. The resulting polyester unit corresponds to a polyester unit of formula (10a):

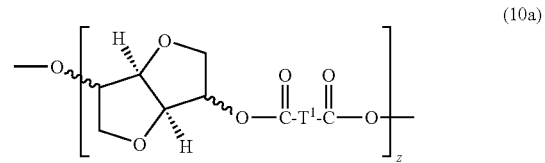

(10a)

wherein $T^1$ is a $C_{1-10}$ aliphatic group derived from the reaction product of the $C_{3-12}$ aliphatic dioic acid with the aliphatic diol of formula (2a), and z is an integer of greater than 1. In a specific embodiment, the polyester-polycarbonate is derived from aliphatic diol-based carbonate units of formula (2) and ester units of formula (10a), to provide aliphatic diol-based polyester polycarbonates of formula (10b):

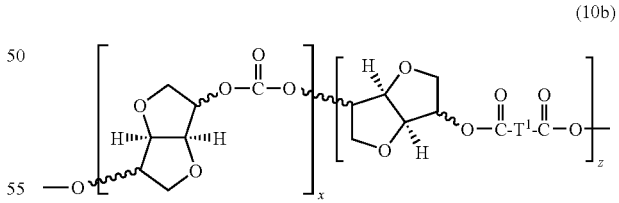

(10b)

wherein $T^1$ is as described above, and the molar ratio of x to z is 50:50 to 100:0, specifically 60:40 to 100:0, more specifically 70:30 to 100:0, still more specifically 80:20 to 100:0, and still yet more specifically 85:15 to 100:0. In another specific embodiment, the polyester-polycarbonate is derived from aliphatic diol-based carbonate units of formula (2) ester units of formula (10a), and carbonate units of formula (1), to provide aliphatic diol-based polyester polycarbonates of formula (10c):

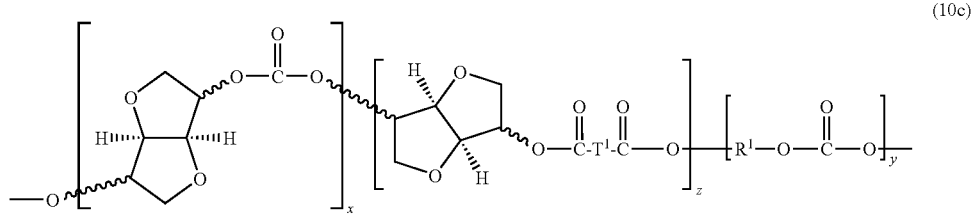

(10c)

wherein $T^1$ and $R^1$ are as described above, $R^1$ (of the carbonate unit of formula (1)) is not identical to the group corresponding to the aliphatic diol-based carbonate unit of formula (2), and the molar ratio of x, y, and z are respectively 50-100:0-30:0-20, specifically 60-100:0-25:0-15, more specifically 70-100:0-20:0-10, and still more specifically 80-100:0-15:0-5.

A polycarbonate can also include a polysiloxane-polycarbonate comprising carbonate units of formula (1) and polysiloxane blocks derived from a siloxane-containing dihydroxy compounds (also referred to herein as "hydroxyaryl end-capped polysiloxanes") that contains diorganosiloxane units blocks of formula (11):

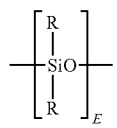

(11)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a transparent aliphatic diol-based polycarbonate is desired, R does not contain any halogen. Combinations of the foregoing R groups can be used in the same aliphatic diol-based polycarbonate.

The value of E in formula (11) can vary widely depending on the type and relative amount of each of the different units in the aliphatic diol-based polycarbonate, the desired properties of the aliphatic diol-based polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (12):

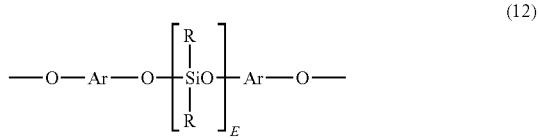

(12)

wherein E is as defined above; each R is the same or different, and is as defined above; and each Ar is the same or different, and is a substituted or unsubstituted $C_6$-$C_{30}$ arylene group, wherein the bonds are directly connected to an aromatic moiety. Ar groups in formula (12) can be derived from a $C_6$-$C_{30}$ dihydroxyarylene compound, for example a dihydroxyarylene compound of formula (8) or (9) described in detail below. Combinations comprising at least one of the foregoing dihydroxyarylene compounds can also be used. Exemplary dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (12a):

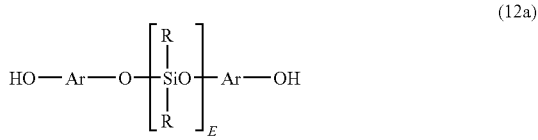

(12a)

wherein Ar and E are as described above. Compounds of formula (12a) can be obtained by the reaction of a dihydroxyarylene compound with, for example, an alpha, omega-bis-acetoxy-polydiorganosiloxane oligomer under phase transfer conditions. Compounds of formula (12a) can also be obtained from the condensation product of a dihydroxyarylene compound, with, for example, an alpha, omega bis-chloro-polydimethylsiloxane oligomer in the presence of an acid scavenger.

In another embodiment, polydiorganosiloxane blocks comprises units of formula (13):

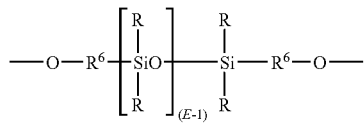
(13)

wherein R and E are as described above, and each $R^6$ is independently a divalent $C_1$-$C_{30}$ organic group, and wherein the oligomerized polysiloxane unit is the reaction residue of its corresponding dihydroxy compound. The polysiloxane blocks corresponding to formula (13) are derived from the corresponding dihydroxy compound (13a):

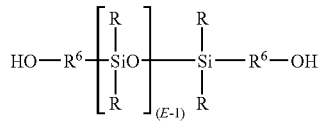
(13a)

wherein R and E and $R^6$ are as described for formula (13).

In a specific embodiment, the polydiorganosiloxane blocks are provided by repeating structural units of formula (14):

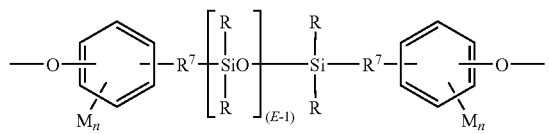
(14)

wherein R and E are as defined above. $R^7$ in formula (14) is a divalent $C_2$-$C_8$ aliphatic group. Each M in formula (14) can be the same or different, and is a halogen, cyano, nitro, $C_1$-$C_8$ alkylthio, $C_1$-$C_8$ allyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an allyl group such as methyl, ethyl, or propyl, an alkoxy group such as methoxy, ethoxy, or propoxy, or an aryl group such as phenyl, chlorophenyl, or tolyl; $R^7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^7$ is a divalent $C_1$-$C_3$ aliphatic group, and R is methyl.

Polysiloxane-polycarbonates comprising units of formula (14) can be derived from the corresponding dihydroxy polydiorganosiloxane (14a):

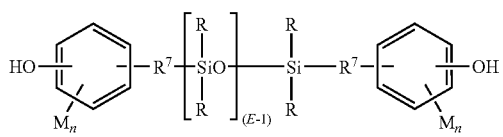
(14a)

wherein each of R, E, M, $R^7$, and n are as described above. Such dihydroxy polysiloxanes can be made by effecting a platinum-catalyzed addition between a siloxane hydride of formula (15):

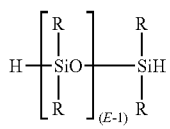
(15)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In an embodiment, the polysiloxane polycarbonate can comprise polysiloxane blocks derived from the corresponding dihydroxy polysiloxane compound, present in an amount of 0.15 to 30 wt %, specifically 0.5 to 25 wt %, and more specifically 1 to 20 wt % based on the total weight of polysiloxane blocks and carbonate units. In a specific embodiment, the polysiloxane blocks are present in an amount of 1 to 10 wt %, specifically 2 to 9 wt %, and more specifically 3 to 8 wt %, based on the total weight of polysiloxane blocks and carbonate units.

Polysiloxane-polycarbonates further comprise carbonate units of formula (1) derived from a dihydroxy aromatic compound of formula (4). In an exemplary embodiment, the dihydroxy aromatic compound is bisphenol A. In an embodiment, the carbonate units comprising the polysiloxane-polycarbonate are present in an amount of 70 to 99.85 wt %, specifically 75 to 99.5, and more specifically 80 to 99 wt % based on the total weight of polysiloxane blocks and carbonate units. In a specific embodiment, the carbonate units are present in an amount of 90 to 99 wt %, specifically 91 to 98 wt %, and more specifically 92 to 97 wt %, based on the total weight of polysiloxane blocks and carbonate units.

The polycarbonates, including the aliphatic diol-based polycarbonates disclosed herein, can have a weight average molecular weight (Mw) of greater than about 1,000. In an embodiment, the aliphatic diol-based polycarbonates can have an Mw of less than or equal to about 100,000 g/mol. In an embodiment, the aliphatic diol-based polycarbonate has an Mw of greater than or equal to about 40,000 g/mol, specifically greater than or equal to about 42,000 g/mol, more specifically greater than or equal to about 45,000 g/mol, and still more specifically greater than about 50,000 g/mol. In a specific embodiment, the aliphatic diol-based polycarbonate is an isosorbide-based polycarbonate homopolymer with an Mw of greater than or equal to about 40,000 g/mol. In another specific embodiment, the aliphatic diol-based polycarbonate is an isosorbide-based polycarbonate copolymer with an Mw of greater than or equal to about 46,000 g/mol, specifically greater than or equal to about 48,000 g/mol, more specifically greater than or equal to about 50,000 g/mol, and still more specifically greater than or equal to about 51,000 g/mol. In a specific embodiment, the isosorbide-based polycarbonate copolymer is an isosorbide-based polyester-polycarbonate comprising carbonate units and ester units. In an embodiment, the aliphatic diol-based polycarbonate (homo- or copolymer) has a number averaged molecular weight (Mn) of greater than or equal to about 17,000 g/mol, specifically greater than or equal to about 18,000 g/mol, more specifically greater than or equal to about 19,000 g/mol, and still more specifically greater than about 20,000 g/mol. The polydispersity (Mw/Mn) for the aliphatic diol-based polycarbonate is less than or equal to 3, specifically less than or equal to 2.5, more specifically less than or equal to 2.2, and still more specifically less than or equal to 2.1. In an embodiment, the aliphatic diol-based polycarbonate is an isosorbide-based polycarbonate homo- or copolymer with a polydispersity of less than 2.0, specifically less than or equal to 1.96, and specifically less than or equal to 1.9. Molecular weight (Mw and Mn) as described herein, and polydispersity as calculated therefrom, is as determined using gel permeation chromatography (GPC), using a crosslinked styrene-divinylbenzene column and calibrated to polystyrene standards. GPC samples are prepared in a solvent such as methylene chloride or chloroform at a concentration of about 1 mg/ml, and are eluted at a flow rate of about 1.5 ml/min.

Polycarbonates, including the aliphatic diol-based polycarbonates disclosed herein, can have a melt volume ratio (MVR) of about 0.5 to about 80, more specifically about 2 to about 40 cm$^3$/10 minutes, measured at 250° C. under a load of 5 kg according to ASTM D1238-04.

The aliphatic diol-based polycarbonates can further be manufactured to be substantially transparent. In this case, the aliphatic diol-based polycarbonate can have a transparency of greater than or equal to 55%, specifically greater than or equal to 60%, more specifically greater than or equal to 70%, still more specifically greater than or equal to 80%, and still more specifically greater than or equal to 90%, as measured using 3.2 mm plaques according to ASTM D1003-00. Alternatively, or in addition, the aliphatic diol-based polycarbonates can have a haze of less than or equal to 15%, specifically less than or equal to 10%, and still more specifically less than or equal to 5%, as measured using 3.2 mm thick plaques according to ASTM D1003-00. In a specific embodiment, the aliphatic diol-based polycarbonate is an isosorbide-based polycarbonate homo- or copolymer with a haze of less than about 5%, and more specifically less than or equal to 4%, and still more specifically less than or equal to 3%, as measured using 3.2 mm thick plaques according to ASTM D1003-00.

Polycarbonates can typically be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions, e.g., about 8 to about 10.

However, as disclosed herein, the aliphatic-diol based polycarbonate is desirably prepared by a melt polymerization process. Generally, in the melt polymerization process, polycarbonates are prepared by co-reacting, in a molten state, the dihydroxy reactant(s) and a diaryl carbonate ester, such as diphenyl carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

The melt polymerization includes a transesterification catalyst comprising a first catalyst, also referred to herein as an alpha catalyst, comprising a metal cation and an anion. In an embodiment, the cation is an alkali or alkaline earth metal comprising Li, Na, K, Cs, Rb, Mg, Ca, Ba, Sr, or a combination comprising at least one of the foregoing. The anion is hydroxide (OH$^-$), superoxide (O$^{2-}$), thiolate (HS$^-$), sulfide (S$^{2-}$), a C$_{1-20}$ alkoxide, a C$_{6-20}$ aryloxide, a C$_{1-20}$ carboxylate, a phosphate including biphosphate, a C$_{1-20}$ phosphonate, a sulfate including bisulfate, sulfites including bisulfites and metabisulfites, a C$_{1-20}$ sulfonate, a carbonate including bicarbonate, or a combination comprising at least one of the foregoing. Salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. In general transesterification catalysts can include as salts hydroxides such as lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, NaH$_2$PO$_3$, NaH$_2$PO$_4$, Na$_2$H$_2$PO$_3$, KH$_2$PO$_4$, CsH$_2$PO$_4$, Cs$_2$H$_2$PO$_4$, Na$_2$SO$_3$, Na$_2$S$_2$O$_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In an embodiment, the transesterification catalyst is an alpha catalyst consisting essentially of an alkali metal salt. In a specific embodiment, the catalyst consists essentially of a sodium salt capable of providing a hydroxide ion upon exposure to moisture. In a more specific embodiment, the transesterification catalyst consists essentially of a sodium salt such as sodium oxide; sodium hydroxide; sodium bicarbonate; sodium carbonate; sodium alkoxides such as sodium methoxide, sodium ethoxide, sodium isopropoxide, sodium t-butoxide, sodium phenolate, or the like, or a combination comprising at least one of the foregoing. In a specific embodiment, the sodium salt can generate sodium hydroxide upon exposure to moisture, or moisture and elevated temperatures as encountered during reaction and/or extrusion. An exemplary sodium salt for use as a transesterification catalyst is sodium hydroxide.

The alpha catalyst can be used in amounts of up to 150 µmol, based on the scale of the reaction. In an embodiment, the amount of alpha catalyst can be about 0.01 to about 30 µmol, specifically about 0.01 to about 20 µmol, more specifically about 0.1 to about 10 µmol, more specifically about 0.5 to about 9 µmol, and still more specifically about 1 to about 7 µmol, per mole of aliphatic diol and any other dihydroxy compound present in the melt polymerization. In another embodiment, the alpha catalyst can be used in an amount of about 6 to about 75 µmol in production scale batch processes. In another embodiment, the alpha catalyst can be used in an amount of about 75 to 150 µmol in production scale continuous operations (i.e., those having shorter residence times for the reactants). In addition, the minimum amount of alpha catalyst used can be adjusted according to the Na content of the reactants, where the number of equivalents of Na (and present in the form as a reactive salt such as, for example, NaOH, Na$_2$CO$_3$, NaHCO$_3$, or the like) can be additive to the number of equivalents of alpha catalyst used, to provide a total alpha catalyst content for the polymerization reaction. The Na content can be in any reactant, but is in an embodiment contributed specifically by the isosorbide. In an embodiment, the total alpha catalyst is the sum of the equivalents of Na plus the number of equivalents of alpha catalyst. The Na level in the reactants can about 0.4 to about 10 ppm based on weight, and can vary with the commercial source of the reactant.

In addition, a second transesterification catalyst, also referred to herein as a beta catalyst, may be included in the melt polymerization process, provided that the inclusion of such a second transesterification catalyst does not significantly adversely affect the desirable properties of the aliphatic diol-based polycarbonate. Exemplary transesterification catalysts may further include a combination of a phase transfer catalyst of formula (R$^3$)$_4$Q$^+$X above, wherein each R$^3$ is the same or different, and is a C$_{1-10}$ alkyl group; Q is a nitrogen or phosphorus atom; and X is a halogen atom or a C$_{1-8}$ alkoxy group or C$_{6-18}$ aryloxy group. Exemplary phase transfer catalyst salts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a C$_{1-8}$ alkoxy group or a C$_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In some embodiments, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In an embodiment, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In a specific embodiment, the beta catalyst is present in an amount of less than about 10 ppm, specifically less than about 1 ppm, more specifically less than or equal to about 0.1 ppm, and more specifically less than or equal to about 0.01 ppm, and even more specifically less than or equal to about 0.001 ppm, based on the total weight of all components used in the melt polymerization reaction.

In an embodiment, where a melt process is used, a thermal stabilizer can be added to the polymerization to mitigate or eliminate any potential degradation of the dihydroxy alkylene oxide compound during the high temperatures (up to about 350° C. or higher) of the melt polymerization. It is known that isosorbide polymers are susceptible to thermal degradation, and therefore inclusion of a thermal stabilizer can reduce the degree of decomposition of the isosorbide compound and thereby provide a lower level of impurity and lead to higher batch-to-batch consistency in the desired properties of the polycarbonate composition.

The use of a melt process employing an activated carbonate is particularly preferred. As used herein, the term "activated carbonate", also at times referred to as activated diarylcarbonate, is defined as a diarylcarbonate that is more reactive than diphenylcarbonate in transesterification reactions. In an embodiment, the activated carbonate has a formula (16):

wherein Ar is a substituted C$_{6-30}$ aromatic group. In a specific embodiment, the activated carbonates have the formula (17):

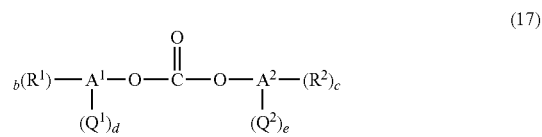

wherein Q$^1$ and Q$^2$ are each independently an activating group present on A$^1$ and A$^2$ respectively, positioned ortho to the carbonate linkage; A$^1$ and A$^2$ are each independently aromatic rings which can be the same or different; "d" and "e" have a value of 0 to a maximum equivalent to the number of replaceable hydrogen groups substituted on the aromatic rings A$^1$ and A$^2$ respectively, and the sum "d+e" is greater than or equal to 1; R$^1$ and R$^2$ are each independently a C$_{1-30}$ aliphatic group, a C$_{3-30}$ cycloaliphatic group, a C$_{5-30}$ aromatic group, cyano, nitro or halogen; "b" has a value of 0 to a maximum equivalent to the number of replaceable hydrogen atoms on the aromatic ring A$^1$ minus "d"; and "c" is a whole number from 0 to a maximum equivalent to the number of replaceable hydrogen atoms on the aromatic ring A$^2$ minus "e". The number, type and location of the $R^1$ or $R^2$ substituents on the aromatic ring is not limited unless they deactivate the carbonate and lead to a carbonate, which is less reactive than diphenylcarbonate.

Non-limiting examples of suitable activating groups $Q^1$ and $Q^2$ include (alkoxycarbonyl)aryl groups, halogens, nitro groups, amide groups, sulfone groups, sulfoxide groups, or imine groups with structures shown below:

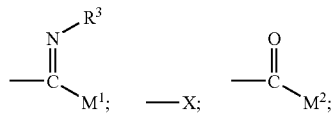

wherein X is halogen or nitro; $M^1$ and $M^2$ independently comprise N-dialkyl, N-alkylaryl, an aliphatic functionality or an aromatic functionality; and $R^3$ is an aliphatic functionality or an aromatic functionality.

Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures where the type and number of substitutions on $A^1$ and $A^2$ are different can also be used as the carbonate precursor. In an embodiment, the activated carbonate is an ester-substituted diarylcarbonate having the formula (18):

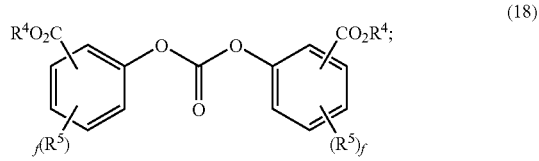

wherein $R^4$ is independently at each occurrence a $C_{1-20}$ aliphatic group, a $C_{4-20}$ cycloaliphatic group, or a $C_{4-20}$ aromatic group, $R^5$ is independently at each occurrence a halogen atom, cyano group, nitro group, a $C_{1-20}$ aliphatic group, a $C_{4-20}$ cycloaliphatic group, or a $C_{4-20}$ aromatic group and f is independently at each occurrence an integer having a value of 0 to 4. In one embodiment, at least one of the substituents —$CO_2R^4$ is attached in an ortho position of formula (18).

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one embodiment, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures may also be used as non-activated carbonates.

An end-capping agent (also referred to as a chain-stopper) can be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ allyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Endgroups can derive from the carbonyl source as well as any added end-capping groups. Thus, in an embodiment, a polycarbonate can comprise a structural unit derived from the carbonyl source. In a further embodiment, the carbonyl source is derived from an activated or non-activated carbonate. In a specific embodiment, where BMSC is used as the carbonyl source, the endgroup is derived from and is a residue of BMSC, having the structure of formula (18a):

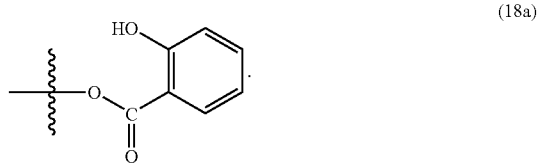

In an embodiment, where the aliphatic diol-based polycarbonate is prepared using only an alpha catalyst, the endgroup derived from BMSC is present in an amount of less than or equal to 500 ppm, specifically less than or equal to 400 ppm, more specifically less than or equal to 300 ppm, and still more specifically less than or equal to 200 ppm, based on the weight of the polycarbonate.

Suitable monocarboxylic acid chlorides include monocyclic, mono-carboxylic acid chlorides such as benzoyl chloride, $C_1$-$C_{22}$ allyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are monochloroformates including monocyclic monochloroformates, such as phenyl chloroformate, $C_1$-$C_{22}$ allyl-substituted phenyl chloroformate, p-cumyl phenyl chloroformate, toluene chloroformate, and combinations thereof.

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio at about 0.8 to about 1.3 and more preferably 0.9 to about 1.1 and all subranges there between, relative to the total moles of aromatic dihydroxy compound and aliphatic diol.

The melt polymerization reaction using an activated aromatic carbonate is conducted by subjecting the above reaction mixture to a series of temperature-pressure-time protocols. In some embodiments, this involves gradually raising the reaction temperature in stages while gradually lowering the pressure in stages. In one embodiment, the pressure is reduced from about atmospheric pressure at the start of the reaction to about 0.01 millibar (1 Pa) or in another embodiment to 0.05 millibar (5 Pa) in several steps as the reaction approaches completion. The temperature may be varied in a stepwise fashion beginning at a temperature of about the melting temperature of the reaction mixture and subsequently increased to about 320° C. In one embodiment, the reaction mixture is heated from room temperature to about 150° C. The polymerization reaction starts at a temperature of about 150° C. to about 220° C., then is increased to about 220° C. to about 250° C. and is then further increased to a temperature of about 250° C. to about 320° C. and all subranges there between. The total reaction time is about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. Efficient removal of the by-product may be achieved by different techniques such as reducing the pressure. Generally the pressure starts relatively high in the beginning of the reaction and is lowered progressively throughout the reaction and temperature is raised throughout the reaction. Experimentation is needed to find the most efficient conditions for particular production equipment.

The progress of the reaction may be monitored by measuring the melt viscosity or the weight average molecular weight of the reaction mixture using techniques known in the art such as gel permeation chromatography. These properties may be measured by taking discreet samples or may be measured on-line. After the desired melt viscosity and/or molecular weight is reached, the final polycarbonate product may be isolated from the reactor in a solid or molten form. It will be appreciated by a person skilled in the art, that the method of making aliphatic homopolycarbonate and aliphatic-aromatic copolycarbonates as described in the preceding sections may be made in a batch or a continuous process and the process disclosed herein is essentially preferably carried out in a solvent free mode. Reactors chosen should ideally be self-cleaning and should minimize any "hot spots."However, vented extruders similar to those that are commercially available may be used.

In one embodiment, the aliphatic homopolycarbonate and aliphatic-aromatic copolycarbonate may be prepared in an extruder in the presence of one or more catalysts, wherein the carbonating agent is an activated aromatic carbonate. The reactants for the polymerization reaction can be fed to the extruder in powder or molten form. In one embodiment, the reactants are dry blended prior to addition to the extruder. The extruder may be equipped with pressure reducing devices (e.g., vents), which serve to remove the activated phenol by-product and thus drive the polymerization reaction toward completion. The molecular weight of the polycarbonate product may be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, sidestreams and sizes. One skilled in the art may have to experiment to find the best designs using generally known principals of commercial extruder design.

The aliphatic diol-based polycarbonates of isosorbide, including copolycarbonates with aromatic diols such as, e.g. bisphenol A (BPA), or with dicarboxylic acids such as, in an exemplary embodiment dodecane dioic acid (DDDA), where the copolymer comprises isosorbide-diacid ester groups and isosorbide-based carbonate groups, and homopolycarbonates of isosorbide made by the melt route using BMSC or DPC as the carbonate source may discolor when exposed to high temperatures greater than 250° C. Residual catalyst in the polycarbonates may be a potential contributor to the discoloration. To arrest the effect of residual catalyst in the polycarbonate in accelerating formation of color bodies, the residual catalyst may be quenched with calculated amounts of phosphorus acid or n-butyl tosylate. The quenched polycarbonate on heating to high temperatures beyond 250° C. has higher resistance for discoloration. The type of quencher, mode of addition and dosage of each quencher in relation to the catalyst dosage are critical for achieving the optimum results. It was found that the best results were obtained when phosphorus acid was used at 50 times (mole terms) the levels of NaOH catalyst that was initially added in the reactor during polymerization.

Aliphatic diol-based polycarbonates, specifically isosorbide-based polycarbonates, can be prepared with relatively high molecular weights as defined hereinabove where the amount of isosorbide is low as a percentage of the total number of moles of copolymerizable diols. However, it has been found previously that high Mw isosorbide-based polycarbonates cannot be prepared with high (greater than 50 mol %) percentages of isosorbide-based carbonate units. As disclosed herein, the problems of the prior art, that of making isosorbide homopolycarbonate having high molecular weight, have been solved by the inventors hereof. Isosorbide homopolycarbonate of sufficiently high molecular weight by both activated and non-activated melt polymerization process can be prepared using the catalyst system disclosed herein. A catalyst system consisting essentially of an alpha catalyst allows synthesis of isosorbide homo- and copolycarbonates to a molecular weight above 40,000 g/mol relative to polystyrene standards. This catalyst system is applicable to melt polymerization processes using both activated carbonates (e.g., BMSC) and non-activated carbonates (e.g., DPC), particularly to the activated (BMSC) process.

Typically, in the melt transesterification polymerization process for making polycarbonate, the diol (aliphatic and/or aromatic) is condensed with the carbonate source (e.g., BMSC or DPC) in the presence of a catalyst comprising: (a) an alpha catalyst selected from the group consisting of alkali metal salts and alkaline earth metal salts; and (b) a beta catalyst selected from the group consisting of quaternary ammonium compound and a quaternary phosphonium compounds. Surprisingly, it has been found that presence of a beta catalyst actually hinders the molecular weight building of isosorbide homopolymer. For example, in the presence of the most commonly used beta catalysts, such as tetramethylammonium hydroxide (TMAH) or tetrabutylphosphonium acetate (TBPA), the molecular weight of isosorbide homopolycarbonates was found to be lower when compared to isosorbide homopolycarbonate prepared in the absence of beta catalysts. Further, with the inclusion of increasing amounts of TMAH as a beta catalyst, the observed Mw of isosorbide homopolycarbonate decreased. There is no literature disclosure of this phenomenon for the production of isosorbide-based polycarbonates. Therefore, as disclosed herein, isosorbide polymers, i.e. homopolymers and copolymers, are prepared in the absence of the beta catalyst. Preferred catalysts for effecting the melt polymerization include the aforementioned alkali metal cation containing catalysts. In an exemplary embodiment, sodium hydroxide is a useful catalyst. Isosorbide polymers so prepared have weight averaged molecular weights of greater than or equal to about 40,000 g/mol. In an embodiment, isosorbide-containing copolymers can have weight averaged molecular weights greater than about 45,000 g/mol. Polymer molecular weights are determined as discussed above as determined by gel-permeation chromatography relative to polystyrene standards.

In addition to the aliphatic diol-based polycarbonates described above, thermoplastic compositions comprising combinations of the aliphatic diol-based polycarbonate with other thermoplastic polymers that do not comprise the aliphatic diol-based carbonate units of formula (2) can be prepared using, for example homopolycarbonates, other polycarbonate copolymers (i.e., copolycarbonates) comprising different $R^1$ moieties in the carbonate units of formula (1), polysiloxane-polycarbonates, polyester-carbonates (also referred to as a polyester-polycarbonates), and polyesters. These combinations can comprise 1 to 99 wt %, specifically 10 to 90, more specifically 20 to 80 wt % of the aliphatic diol-based polycarbonate, with the remainder of the compositions being other of the foregoing polymers, and/or additives as described below.

In addition to the aliphatic diol-based polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

For example, the thermoplastic composition can further include as an additive an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Where used, impact modifiers are generally present in amounts of up to 30 parts by weight, specifically 1 to 30 parts by weight, based on 100 parts by weight of aliphatic diol-based polycarbonate, additional polymer, and any impact modifier.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 20 parts by weight, based on 100 parts by weight of aliphatic diol-based polycarbonate, additional polymer, and any impact modifier.

Exemplary antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.1 parts by weight, based on 100 parts by weight of aliphatic diol-based polycarbonate, additional polymer, and any impact modifier.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.1 parts by weight, based on 100 parts by weight of aliphatic diol-based polycarbonate, additional polymer, and any impact modifier.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 5 parts by weight, based on 100 parts by weight of aliphatic diol-based polycarbonate, additional polymer, and any impact modifier.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to about 100 nanometers; or the like, or combinations comprising at least one of the foregoing UV absorbers. UV absorbers are generally used in amounts of about 0.01 to about 5 parts by weight, based on 100 parts by weight of aliphatic diol-based polycarbonate, additional polymer, and any impact modifier.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of about 0.1 to about 1 parts by weight, based on 100 parts by weight of aliphatic diol-based polycarbonate, additional polymer, and any impact modifier.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and IRGASTAT® P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of about 0.05 to about 0.5 parts by weight, based on 100 parts by weight of aliphatic diol-based polycarbonate, additional polymer, and any impact modifier.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of about 0.001 to about 3 parts by weight, based on 100 parts by weight of aliphatic diol-based polycarbonate, additional polymer, and any impact modifier.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of about 0.0001 to about 5 parts by weight, based on 100 parts by weight of aliphatic diol-based polycarbonate, additional polymer, and any impact modifier.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of about 1 to about 20 parts by weight, based on 100 parts by weight of aliphatic diol-based polycarbonate, additional polymer, and any impact modifier.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl)phosphate, phenyl bis(3,5,5'-trimethylhexyl)phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

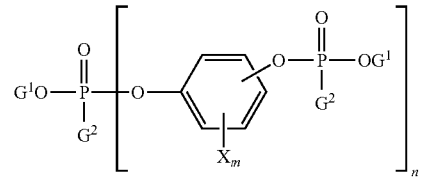

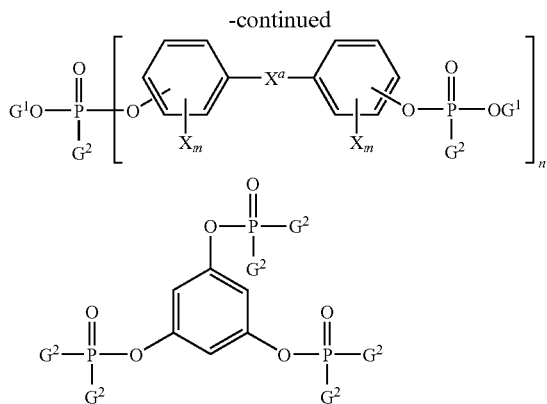

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Exemplary di- or polyfunctional aromatic phosphorus-containing compounds include resorcinol tetraphenyl diphosphate (RDP), the bis(diphenyl) phosphate of hydroquinone and the bis(diphenyl)phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of about 0.1 to about 30 parts by weight, more specifically about 1 to about 20 parts by weight, based on 100 parts by weight of aliphatic diol-based polycarbonate, additional polymer, and any impact modifier.

Halogenated materials can also be used as flame retardants, for example halogenated compounds and resins of formula (19):

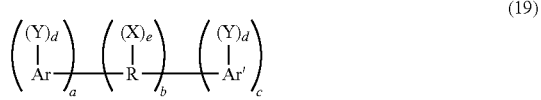
(19)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (19) are each independently mono- or polycarbocyclic aromatic groups such as phenylene, biphenylene, terphenylene, naphthylene, or the like.

Y is an organic, inorganic, or organometallic radical, for example (a) halogen, e.g., chlorine, bromine, iodine, fluorine or (b) ether groups of the general formula OB, wherein B is a monovalent hydrocarbon group similar to X or (c) monovalent hydrocarbon groups of the type represented by R or (d) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of about 1 to about 25 parts by weight, more specifically about 2 to about 20 parts by weight, based on 100 parts by weight of aliphatic diol-based polycarbonate, additional polymer, and any impact modifier.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of the composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoroanion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 10 parts by weight, more specifically about 0.02 to about 1 parts by weight, based on 100 parts by weight of aliphatic diol-based polycarbonate, additional polymer, and any impact modifier.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. Antidrip agents are generally used in amounts of 0.1 to 10 percent by weight, based on 100 percent by weight of aliphatic diol-based polycarbonate, additional polymer, and any impact modifier.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—$CH_2OH$) or it can be a member of a more complex hydrocarbon group such as —$CR^4HOH$ or —$CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.05 to 1 parts by weight based on 100 parts by weight of aliphatic diol-based polycarbonate, additional polymer, and any impact modifier.

Thermoplastic compositions comprising the aliphatic diol-based polycarbonate can be manufactured by various methods. For example, powdered aliphatic diol-based polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The process disclosed herein can be used to prepare aliphatic polycarbonate and aliphatic-aromatic copolycarbonates having a weight average molecular weight (Mw) of greater than about 40,000 g/mol. The glass transition temperature (Tg) of the aliphatic diol-based polycarbonates can be greater than or equal to about 140° C., specifically greater than or equal to about 145° C., and more specifically greater than or equal to about 150° C. In one embodiment the glass transition temperature of the aliphatic diol-based polycarbonates can be greater than or equal to about 90° C. and less than about 130° C. In another embodiment the glass transition temperature of the aliphatic diol-based polycarbonates can be greater than or equal to about 100° C. and less than about 125° C. The number average molecular weights (Mn) of the aliphatic-aromatic copolycarbonate is greater than about 17,000 g/mol. The homo and copolycarbonates disclosed herein may further exhibit lower Refractive Index (RI), transparency (high % transmission and low haze), higher scratch resistance and lower oxygen permeability compared to conventional BPA homopolycarbonate. Furthermore, the disclosed homo and copolycarbonates are also optically active where prepared using enantiomerically pure or enantiomerically enriched aliphatic diol (e.g., D-(+)-isosorbide, and the like).

The homo and copolycarbonates may be used in making various articles including, but not limited to a film, a sheet, an optical wave guide, a display device and a light emitting diode prism. Furthermore the polycarbonates may further be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desktop computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

The aliphatic diol-based polycarbonates are further illustrated by the following non-limiting examples.

Gel Permeation Chromatography (GPC) was used to determine the molecular weights (Mw and Mn, and polydispersity) of the aliphatic diol-based (isosorbide) polycarbonates. A crosslinked styrene-divinylbenzene mixed-bed column was used for the analysis. The column temperature was maintained at 30° C. The column was eluted with chloroform as eluent, at a flow rate of 1.00 ml per minute. The sample solution was prepared by dissolving the 20 milligrams (mg) of the isosorbide polycarbonate in 10 ml of chloroform. 10 microliters ($\mu$l) of the sample solution was injected in the column and the sample was eluted over a total run time of less than 2 hours. A calibration curve (i.e., a universal calibration curve) was constructed using polystyrene standards with narrow polydispersity. Molecular weights are expressed as molecular weights against polystyrene. A refractive index detector was used.

Method I. Exemplary Method of Making Isosorbide Polycarbonate Homopolymer by the Activated Melt Polymerization Process (Including Alpha And Beta Catalysts):

To a cylindrical polymerization reactor made of glass and having a length of 29 cm, outer diameter 3.8 cm and inner diameter 3.2 cm, were charged: (a) isosorbide (13.162 g, 0.08826 mol) (available from Roquette, with a typical sodium level of 7 to 11 ppm as determined by atomic absorption spectroscopy); (b) bis(methylsalicyl) carbonate (BMSC) (30.0 g, 0.09090 mol); (c) NaOH ($4.5 \times 10^{-6}$ moles per mole of isosorbide and (d) tetramethylammonium hydroxide ($1.00 \times 10^{-4}$ moles per mole of isosorbide). The atmosphere inside the reactor was then evacuated using a vacuum source to a pressure of less than 1 millibar, and purged with nitrogen. This cycle was repeated 3 times after which the contents of the reactor were heated to melt the monomer mixture. Finally the pressure inside the reactor was raised to atmospheric pressure by nitrogen. Then, the reaction was heated over about 10 to 15 minutes to 150° C. to melt the reactants, and held at temperature followed by temperature/pressure increase/decrease according to the following temperature/pressure profile: (1) 150° C., 1 atmosphere for 10 minutes; (2) 180° C., 1 atmosphere, 10 minutes; (3) 200° C., 1 atmosphere, 5 minutes; (4) 200° C., 500 millibar, 10 minutes; (5) 220° C., 100 millibar, 15 minutes; (6) 270° C. at less than 1 millibar, 20 minutes. After allowing the reaction to proceed under these conditions, the pressure inside the reactor was brought to atmospheric pressure under nitrogen and the reactor was vented to relieve any excess pressure. Product isolation was accomplished by opening the drain nut at the bottom of the reactor, collecting the molten material, and allowing it to cool. $M_w$=<40,000 g/mol (GPC, PS standards); $T_g$=159-169° C.

Method II. Exemplary Method of Making High Molecular Weight Isosorbide Polycarbonate Homopolymer by the Activated Melt Polymerization Process (Alpha Catalyst Only).

The isosorbide polymerization was performed according to the same method as disclosed in Method I, except that only c.) NaOH was included in the reaction, and no addition of component d.) (tetramethylammonium hydroxide) was made. $M_w$=>40,000 g/mol (GPC, PS standards); $T_g$=159-160° C.

Method IIIa and IIIb. Exemplary Method of Making High Molecular Weight Isosorbide Polycarbonate Homopolymer by the Non-Activated Melt Polymerization Process (Alpha/Beta or Alpha Catalyst Only).

The isosorbide polymerization was performed according to the same method as disclosed in Method I (for Method IIIa) or Method II (Method IIIb), except that diphenyl carbonate (DPC) was used instead of BMSC. Mw=<40,000 g/mol (GPC, PS standards); Tg=159-160° C.

Method IVa and IVb. Exemplary Method of Making High Molecular Weight Isosorbide-DDDA Polycarbonate Copolymer by the Non-Activated Melt Polymerization Process (Alpha/Beta or Alpha Catalyst Only).

The isosorbide polymerization was performed according to the same method as disclosed in Method I (for Method IIIa) or Method II (Method IIIb), except that a 90:10 molar ratio of isosorbide to DDDA was used in place of isosorbide only. Mw=>46,000 g/mol (GPC, PS standards).

EXAMPLES 1-5 AND COMPARATIVE EXAMPLES 1-34

Examples 1-5 and Comparative Examples 1-34 were prepared according to the general method for activated melt polymerization synthesis described below. Comparative Examples 27-30 were all prepared using a non-activated melt polymerization process. Alpha catalysts investigated included sodium hydroxide (NaOH), sodium potassium hydrogen phosphate ($NaKHPO_4$), cesium hydroxide (CsOH), and sodium bisulfite ($Na_2S_2O_5$), and beta catalysts used included tetramethylammonium hydroxide (TMAH) or tetrabutylphosphonium acetate (TBPA). The data are summarized in Table 1, below.

TABLE 1

| | Comp. | DAC | Alpha (α) | Beta (β) | μmol cat. (α) | μmol cat. (β) | DAC/diol | Mw (g/mol) | Mn (g/mol) | Mw/Mn |
|---|---|---|---|---|---|---|---|---|---|---|
| CEx 1 | 100% iso | BMSC | NaOH | TBPA | 1.5 | 100 | 1.015 | 14,129 | 8,118 | 1.74 |
| CEx 2 | 100% iso | BMSC | NaOH | TBPA | 1.5 | 100 | 1.010 | 12,778 | 7,257 | 1.76 |
| CEx 3 | 100% iso | BMSC | NaOH | TBPA | 1.5 | 100 | 1.020 | 14,218 | 8,159 | 1.74 |
| CEx 4 | 100% iso | BMSC | NaOH | TBPA | 1.5 | 100 | 1.025 | 14,540 | 8,138 | 1.79 |
| CEx 5 | 100% iso | BMSC | NaOH | TBPA | 1.5 | 100 | 1.030 | 18,002 | 10,403 | 1.73 |
| CEx 6 | 100% iso | BMSC | NaOH | TMAH | 1.5 | 100 | 1.025 | 17,661 | 8,624 | 2.05 |
| CEx 7 | 100% iso | BMSC | NaOH | TMAH | 1.5 | 100 | 1.03 | 23,340 | 12,064 | 1.93 |
| CEx 8 | 100% iso | BMSC | NaOH | TMAH | 4.5 | 100 | 1.03 | 23,544 | 12,419 | 1.90 |
| CEx 9 | 100% iso | BMSC | NaOH | TMAH | 1.5 | 65 | 1.03 | 26,178 | 13,963 | 1.87 |
| CEx 10 | 100% iso | BMSC | — | — | 0 | 0 | 1.03 | 34,709 | 20,828 | 1.67 |
| Ex 1 | 100% iso | BMSC | NaOH | — | 1.5 | 0 | 1.03 | 42,843 | 22,162 | 1.93 |
| Ex 2 | 100% iso | BMSC | NaOH | — | 3 | 0 | 1.03 | 52,224 | 32,163 | 1.62 |
| Ex 3 | 100% iso | BMSC | NaOH | — | 4.5 | 0 | 1.03 | 53,649 | 33,271 | 1.61 |
| CEx 11 | 100% iso | BMSC | NaOH | TMAH | 1.5 | 25 | 1.03 | 35,772 | 21,575 | 1.66 |
| CEx 12 | 100% iso | BMSC | NaOH | TMAH | 4.5 | 25 | 1.03 | 39,783 | 20,866 | 1.91 |
| CEx 13 | 100% iso | BMSC | NaHKPO$_4$ | TBPA | 20 | 100 | 1.015 | 18,192 | 9,462 | 1.92 |
| CEx 14 | 100% iso | BMSC | NaHKPO$_4$ | TBPA | 10 | 200 | 1.015 | 15,284 | 8,298 | 1.84 |
| CEx 15 | 100% iso | BMSC | NaHKPO$_4$ | TBPA | 10 | 400 | 1.015 | 13,350 | 7,253 | 1.84 |
| CEx 16 | 100% iso | BMSC | NaHKPO$_4$ | TBPA | 20 | 400 | 1.015 | 12,738 | 6,857 | 1.86 |
| CEx 17 | 100% iso | BMSC | NaHKPO$_4$ | TBPA | 20 | 100 | 1.015 | 20,795 | 10,730 | 1.94 |
| CEx 18 | 100% iso | BMSC | NaHKPO$_4$ | TBPA | 50 | 100 | 1.015 | 28,477 | 15,510 | 1.84 |
| CEx 19 | 100% iso | BMSC | NaHKPO$_4$ | — | 4.5 | 0 | 1.03 | 32,057 | 17,363 | 1.85 |
| CEx 20 | 100% iso | BMSC | NaHKPO$_4$ | TMAH | 4.5 | 100 | 1.03 | 20,047 | 10,112 | 1.98 |
| CEx 21 | 100% iso | BMSC | CsOH | — | 4.5 | 0 | 1.03 | 31,751 | 16,355 | 1.94 |
| CEx 22 | 100% iso | BMSC | CsOH | TMAH | 4.5 | 100 | 1.03 | 24,541 | 12,419 | 1.98 |
| CEx 23 | 100% iso | BMSC | CsOH | — | 4.5 | 0 | 1.03 | 32,157 | 15,740 | 2.04 |
| CEx 24 | 100% iso | BMSC | CsOH | TMAH | 4.5 | 100 | 1.03 | 21,315 | 9,868 | 2.16 |
| CEx 25 | 100% iso | BMSC | Na$_2$S$_2$O$_5$ | — | 4.5 | 0 | 1.03 | 38,228 | 22,496 | 1.70 |
| CEx 26 | 100% iso | BMSC | Na$_2$S$_2$O$_5$ | TMAH | 4.5 | 100 | 1.03 | 21,282 | 10,610 | 2.01 |
| CEx 27 | 100% iso | DPC | NaOH | — | 4.5 | 0 | 1.050 | 31,549 | 17,042 | 1.85 |
| CEx 28 | 100% iso | DPC | NaOH | TMAH | 4.5 | 100 | 1.050 | 23,652 | 15,305 | 1.55 |
| CEx 29 | 100% iso | DPC | NaOH | — | 4.5 | 0 | 1.050 | 38,987 | 22,589 | 1.73 |
| CEx 30 | 100% iso | DPC | NaOH | TMAH | 4.5 | 100 | 1.050 | 29,880 | 15,470 | 1.93 |
| Ex 4 | 90% iso/ 10% DDDA | BMSC | NaOH | — | 4.5 | 0 | 1.03 | 53,777 | 32,287 | 1.67 |
| Ex 5 | 90% iso/ 10% DDDA | BMSC | NaOH | — | 4.5 | 0 | 1.03 | 51,601 | 31,063 | 1.66 |
| CEx 31 | 90% iso/ 10% DDDA | BMSC | NaOH | TMAH | 4.5 | 100 | 1.03 | 33,207 | 17,140 | 1.94 |
| CEx 32 | 90% iso/ 10% DDDA | BMSC | NaOH | TMAH | 4.5 | 25 | 1.03 | 45,223 | 26,446 | 1.71 |
| CEx 33 | 90% iso/ 10% DDDA | BMSC | NaOH | TMAH | 1.5 | 100 | 1.03 | 35,152 | 18,219 | 1.93 |
| CEx 34 | 90% iso/ 10% DDDA | BMSC | NaOH | TMAH | 1.5 | 25 | 1.03 | 41,879 | 21,658 | 1.93 |

As seen in the data in Table 1, isosorbide homopolymers prepared using a beta catalyst achieve a maximum weight averaged molecular weight of up to just under 40,000 (Comparative Example 12). However, in the absence of a beta catalyst, the Mw for isosorbide homopolymer increases to 42,800 or higher (Exs. 1-3). Use of alkali-based alpha catalysts such as cesium hydroxide (CExs. 21-24), or sodium potassium hydrogen phosphate (CExs. 13-20), or use of non-activated carbonate sources such as DPC (CExs. 27-30) result in lower molecular weights. In addition, polyester copolymers can be prepared using the above method (IVa) (see Exs. 4 and 5), to provide isosorbide-ester units in the polycarbonate (here, as the adduct with DDDA), where the polyester-polycarbonate copolymer has desirable Mw values of greater than 46,000 g/mol (GPC, PS standards).

By way of comparison, the progress of an activated carbonate melt polymerization reaction to prepare isosorbide homopolymer (Mw versus reaction time) in the presence of a beta catalyst is shown graphically in the FIGURE. It can be seen that inclusion of the beta catalyst initially results in a small spike in molecular weigh (t=12 hours) which oscillates until t equals about 17 hours at which time the BMSC concentration is decreased as the hydroxide level increases. Simultaneously, Mw is observed to decrease. The delay is caused by the residence time in the reactor system.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). Where used, wavy bonds in structural formulas are included as generally in the art to show single bonds with unspecified stereochemistry.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of making a polycarbonate polymer comprising isosorbide carbonate units, comprising melt reacting
a dihydroxy compound comprising an isosorbide of the general formula (2a):

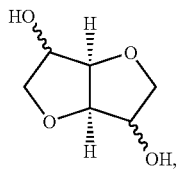

(2a)

and
an activated carbonate,
in the presence of a catalyst consisting essentially of a sodium salt capable of providing a hydroxide ion, wherein the polycarbonate polymer comprises greater than or equal to 50 mol% isosorbide carbonate units, and wherein the polycarbonate polymer has a Mw of greater than or equal to about 40,000 g/mol as determined by gel-permeation chromatography relative to polystyrene standards.

2. The method of claim 1, wherein the isosorbide comprises formula (2b), formula (2c), formula (2d) or a combination comprising at least one of the foregoing:

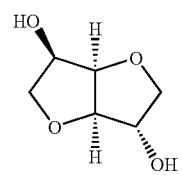

(2b)

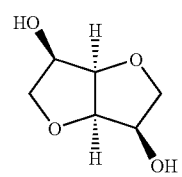

(2c)

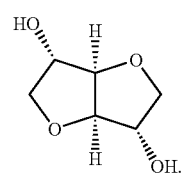

(2d)

3. The method of claim 1, wherein the activated carbonate has a formula (16):

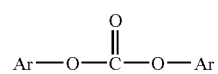

(16)

wherein Ar is a substituted $C_{6-30}$ aromatic group.

4. The method of claim 3, wherein the activated carbonate has formula (17):

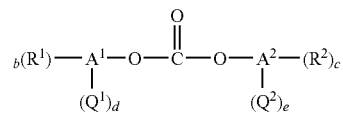

(17)

wherein $Q^1$ and $Q^2$ are each independently an activating group present on $A^1$ and $A^2$ respectively, positioned ortho to the carbonate linkage; $A^1$ and $A^2$ are each independently aromatic rings which can be the same or different; "d" and "e" have a value of 0 to a maximum equivalent to the number of replaceable hydrogen groups substituted on the aromatic rings $A^1$ and $A^2$ respectively, and the sum "d +e" is greater than or equal to 1; $R^1$ and $R^2$ are each independently a $C_{1-30}$ aliphatic group, a $C_{3-30}$ cycloaliphatic group, a $C_{5,-30}$ aromatic group, cyano, nitro or halogen; "b" has a value of 0 to a maximum equivalent to the number of replaceable hydrogen atoms on the aromatic ring $A^1$ minus "d" and "c" is a whole number from 0 to a maximum equivalent to the number of replaceable hydrogen atoms on the aromatic ring $A^2$ minus "e".

5. The method of claim 4, wherein the activated carbonate source comprises bis (methyl salicyl) carbonate.

6. The method of claim 1, wherein the catalyst is present in an amount of 0.01 to 30 μmol, per mole of dihydroxy compound.

7. The method of claim 1, where the sodium salt is sodium hydroxide.

8. The method of claim 1, where the dihydroxy compound further comprises a dihydroxy compound that is not identical to isosorbide.

9. The method of claim 8, wherein the dihydroxy compound is a dihydroxy aromatic compound.

10. The method of claim 9, wherein the dihydroxy aromatic compound comprises a bisphenol of formula (4):

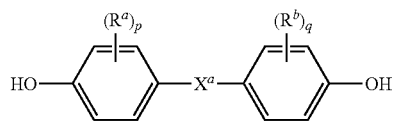
(4)

wherein $R^a$ and $R^b$ each independently represent halogen or $C_{1-12}$ alkyl; p and q are each independently integers of 0 to 4, and $X^a$ is —O—, —S—, —S(O)—, S(O)$_2$—, or one of the groups of formula (5a) or (5b):

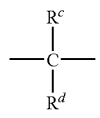
(5a)

(5b)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C^{7-12}$ heteroarylalkyl, and $R^e$ is a divalent $C_{1-12}$ hydrocarbon group.

11. The method of claim 10 wherein $R^c$ and $R^d$ are methyl, and p and q are 0.

12. The method of claim 1, wherein the method further comprises melt reacting a $C_{2-13}$ aliphatic dioic acid or derivative thereof with the isosorbide to form ester units, and wherein the polycarbonate polymer is a polyester-polycarbonate further comprising the ester units.

13. The method of claim 12, wherein the aliphatic dioic acid is 1, 12-dodecanedioic acid.

14. The method of claim 12, wherein the isosorbide polycarbonate polymer has a Mw of greater than or equal to 46,000 g/mol as determined by gel-permeation chromatography relative to polystyrene standards.

15. The method of claim 1, wherein the dihydroxy compound consists essentially of isosorbide.

16. A polycarbonate polymer, comprising carbonate units derived from
a dihydroxy compound comprising an isosorbide of general formula (2a):

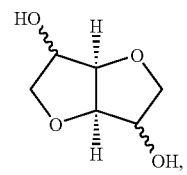
(2a)

and
an activated carbonate,
wherein the polycarbonate polymer comprises greater than 50 mol% isosorbide-derived carbonate units, and wherein the polycarbonate polymer has a Mw of greater than or equal to about 40,000 g/mol as determined by gel-permeation chromatography relative to polystyrene standards.

17. The polycarbonate polymer of claim 14, wherein the polycarbonate polymer is a homopolymer consisting essentially of isosorbide-derived carbonate units.

18. The polycarbonate polymer of claim 14, wherein the polycarbonate polymer further comprises additional carbonate units derived from a dihydroxy compound that is not identical to isosorbide, ester units derived from isosorbide and a $C_{3-12}$ aliphatic dioic acid or derivative, or a combination of these.

19. The polycarbonate polymer of claim 16, wherein the polycarbonate polymer further comprises structural units derived from the activated aromatic carbonate.

20. The composition according to claim 19, wherein the structural units derived from the activated aromatic carbonate are end groups comprising a residue of bis(methyl salicyl) carbonate.

21. A method of making a polycarbonate copolymer comprising isosorbide carbonate units, comprising melt reacting
a dihydroxy compound comprising an isosorbide of the general formula (2a):

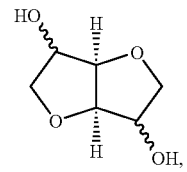
(2a)

a $C_{2-13}$ aliphatic dioic acid or derivative thereof, and
an activated carbonate,
in the presence of a catalyst consisting essentially of a sodium salt capable of providing a hydroxide ion,
wherein the polycarbonate polymer comprises greater than or equal to 50 mol% isosorbide carbonate units, and wherein the polycarbonate polymer has a Mw of greater than or equal to about 46,000 g/mol as determined by gel-permeation chromatography relative to polystyrene standards.

22. A polycarbonate polymer, prepared by the method of claim 1.

23. A polycarbonate copolymer, prepared by the method of claim 21.

24. A thermoplastic composition, comprising the polycarbonate polymer of claim 22 and an additive.

25. An article, comprising the polycarbonate polymer of claim 22.

* * * * *